United States Patent [19]

Demura et al.

[11] Patent Number: 4,820,022
[45] Date of Patent: Apr. 11, 1989

[54] LIQUID CRYSTAL ANTIDAZZLE MIRROR

[75] Inventors: Hiroshi Demura; Kazumi Hayashi, both of Toyota; Yasuo Oyama, Toyota; Sadao Kokubu; Kouji Takizawa, both of Tanba; Shigeru Iguchi, Tanba, all of Japan

[73] Assignees: Toyota Jidosha Kabushiki Kaisha, Toyota; Kabushiki Kaisha Tokai Rika Denki Seisakusho, Tanba, both of Japan

[21] Appl. No.: 886,539

[22] Filed: Jul. 16, 1986

[30] Foreign Application Priority Data

Jul. 17, 1985 [JP] Japan .................. 60-109435[U]

[51] Int. Cl.⁴ .................. G02F 1/13; G02B 17/00
[52] U.S. Cl. .................. 350/331 R; 350/332; 350/278
[58] Field of Search .................. 350/331 R, 338, 342, 350/278, 279, 283, 276 R, 332, 350 S; 361/56, 86, 91, 212, 220

[56] References Cited

U.S. PATENT DOCUMENTS

| 3,943,427 | 3/1976 | Tolstov et al. | 361/56 |
| 4,669,825 | 6/1987 | Itoh et al. | 350/338 |
| 4,671,615 | 6/1987 | Fukada et al. | 350/331 R |
| 4,676,601 | 6/1987 | Itoh et al. | 350/338 |
| 4,683,514 | 7/1987 | Cook | 361/91 |
| 4,712,876 | 12/1987 | Umeda et al. | 350/350 S |

FOREIGN PATENT DOCUMENTS

| 2350819 | 6/1974 | Fed. Rep. of Germany | 361/56 |
| 0358501 | 11/1961 | Switzerland | 361/56 |

Primary Examiner—Stanley D. Miller
Assistant Examiner—Trong Q. Phan
Attorney, Agent, or Firm—Kenyon & Kenyon

[57] ABSTRACT

A liquid crystal antidazzle mirror comprising discharging electrodes respectively provided at electrodes of liquid crystal electrodes, a grounding electrode opposed to the discharging electrodes for discharging a static electricity charged in the liquid crystal section between the discharging electrodes and the grounding electrode. Thus, the antidazzle mirror can protect itself against a static electricity.

2 Claims, 2 Drawing Sheets

LIQUID CRYSTAL ANTIDAZZLE MIRROR

BACKGROUND OF THE INVENTION

This invention relates to a liquid crystal antidazzle mirror used for a vehicle.

A liquid crystal antidazzle mirror is used as one type of an antidazzle mirror in an automobile. This liquid crystal antidazzle mirror is constructed as shown in FIG. 3, and has a liquid crystal element 1 disposed in front of a mirror (not shown), a liquid crystal drive circuit 3 for controlling a voltage applied to the electrodes 2a, 2b of the element 1, and a power switch 4 for turning ON and OFF the power source of the drive circuit 3. When the switch 4 is turned ON in case of the use of the antidazzle mirror, power is supplied from a battery 5. The voltage applied to the electrodes 2a, 2b is controlled by operating a mode change switch (not shown) provided in the drive circuit 3 for switching dazzle and antidazzle modes to alter the light transmission rate of the element 1, thereby controlling the reflectivity of the mirror. Thus, the antidazzle mirror performs antidazzling effect for the dazzling light such as the following vehicle.

The abovementioned antidazzle mirror is disposed, for example, as a rear view mirror in a compartment of an automobile. Thus, since the mirror section is ordinarily exposed with the atmospheric air, it can be readily electrically charged. Since the mirror is further contacted to alter the direction of the mirror or wiped off to remove contaminants on the mirror, the liquid crystal element disposed on the front surface of the mirror tends to be electrostatically charged. When the mirror is thus charged electrostatically, the liquid crystal element is adversely affected by the influence of the electrostatic charge to cause the liquid crystal element to be deteriorated in the characteristics for a long period of time. Since the liquid crystal drive circuit for driving the liquid crystal element utilizes an IC which is weak against the static electricity, it causes the liquid crystal element to be damaged in the insulation. The conventional liquid crystal antidazzle mirror is not remedied against such static electricity.

SUMMARY OF THE INVENTION

It is, accordingly, an object of this invention to provide a liquid crystal antidazzle mirror which can eliminate the aforementioned drawbacks and can protect itself against static electricity.

In order to achieve the above and other objects, there is provided a liquid crystal antidazzle mirror comprising discharging electrodes respectively provided at electrodes of liquid crystal electrodes, a grounding electrode opposed to the discharging electrodes for discharging a static electricity charged in the liquid crystal section between the discharging electrodes and the grounding electrode.

According to the invention, even if the antidazzle mirror is charged at the liquid crystal element section with static electricity, when the charging potential becomes a predetermined level or higher, the static electricity is discharged from the discharging electrodes connected with the liquid crystal electrodes to the grounding electrode. Thus, the static electricity is not stored in the liquid crystal section to thus eliminating the influence of the static electricity on the liquid crystal element and to effectively protect the liquid crystal element and the liquid crystal drive circuit electrically connected to the liquid crystal element.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

This invention will now be described in detail with reference to FIG. 1, which shows an embodiment of the liquid crystal antidazzle mirror according to this invention.

Figure 1:
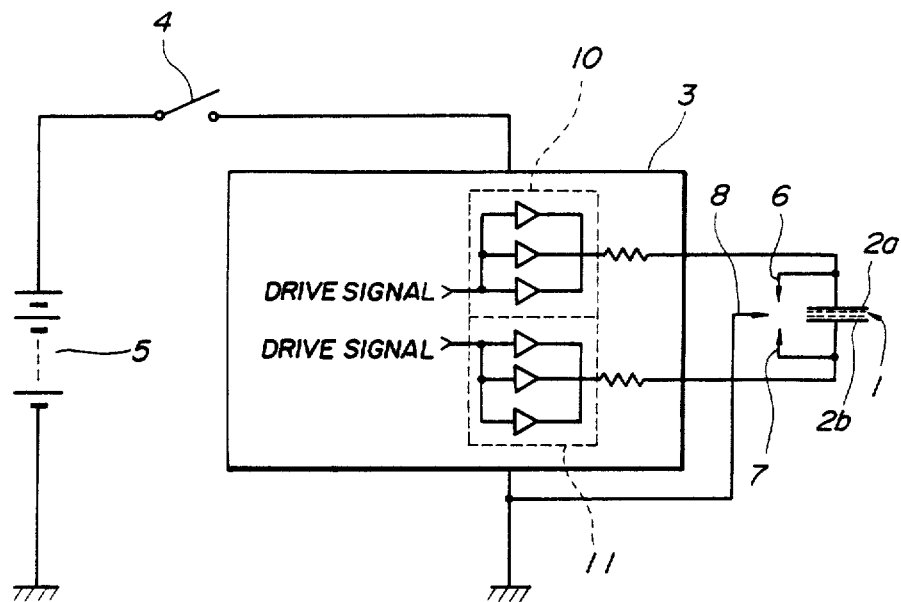
FIG. 1 is an electric circuit diagram showing an embodiment of a liquid crystal antidazzle mirror according to the invention.
Figure 2:
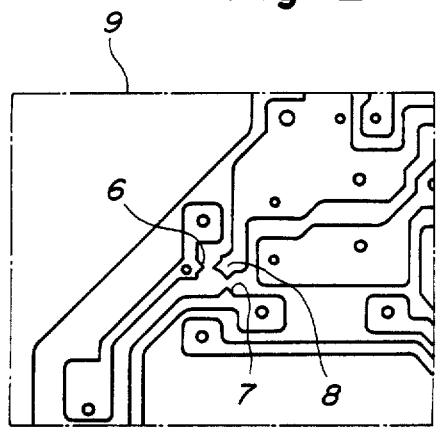
FIG. 2 is a circuit wiring diagram of a printed circuit board of the antidazzle mirror.
Figure 3:
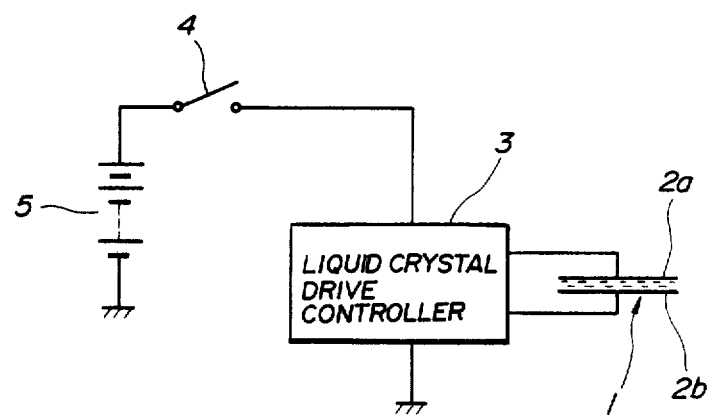
FIG. 3 is a block circuit diagram showing the construction of the conventional antidazzle mirror.
Figure 4:
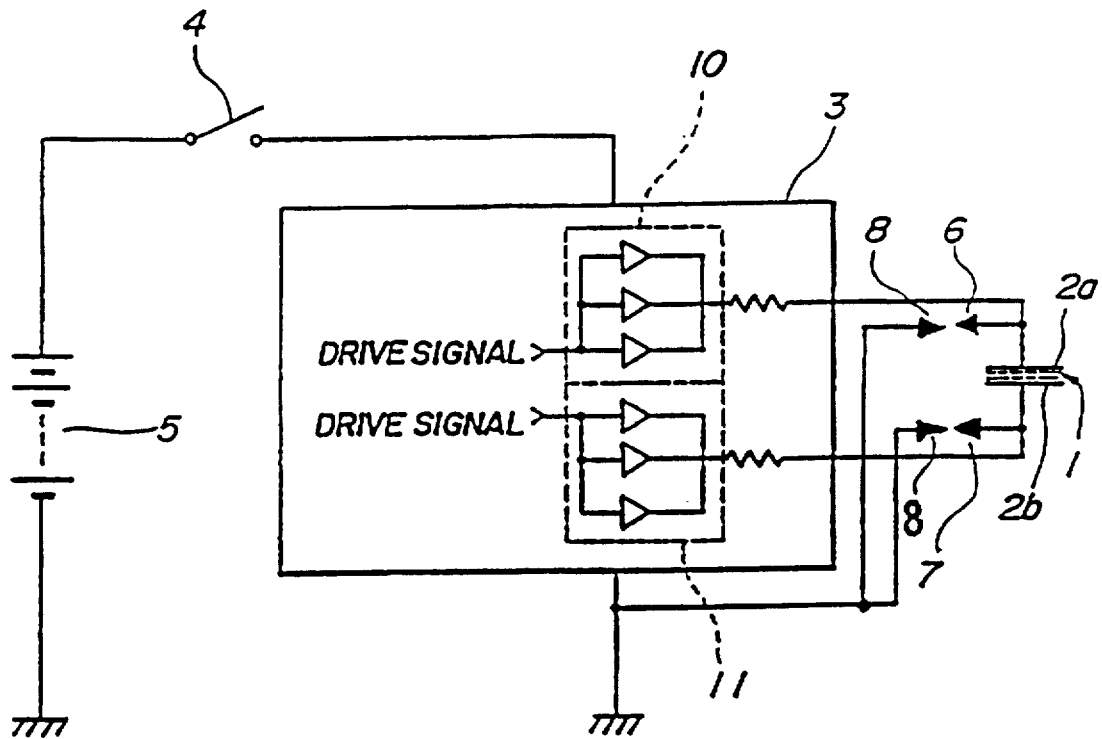
FIG. 4 is an electric circuit diagram showing another embodiment of a liquid crystal antidazzle mirror according to the present invention.
Figure 5:
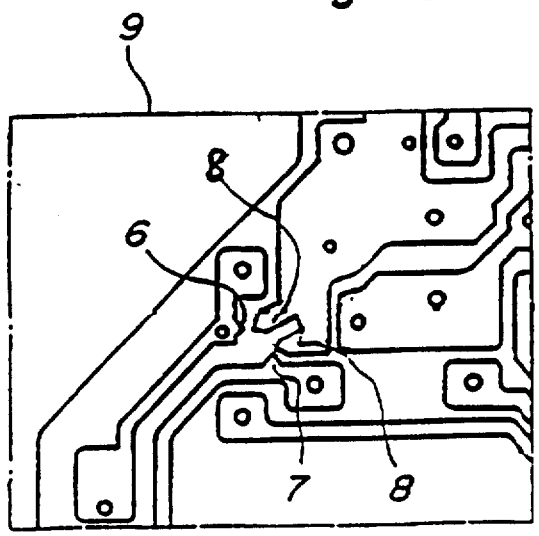
FIG. 5 is a circuit wiring diagram of a printed circuit board showing another embodiment according to the present invention.

FIG. 1 is a block circuit diagram showing an embodiment of a liquid crystal antidazzle mirror according to the present invention. Numeral 1 designates a liquid crystal element, numerals 2a, 2b liquid crystal electrodes, numeral 3 a liquid crystal drive circuit, numeral 4 a power switch, and numeral 5 a battery, which are constructed in the same manner as the conventional liquid crystal antidazzle mirror shown in FIG. 3. This invention comprises in this liquid crystal antidazzle mirror discharging electrodes 6 and 7 respectively provided at the electrodes 2a, 2b, and a grounding electrode 8 opposed to the electrodes 6 and 7. The discharging electrodes 6, 7 and the grounding electrode 8 are formed, as exemplified simply in FIG. 2, by printed wirings on a printed board 9 associated in the drive circuit 3. In the embodiment shown in FIGS. 1 and 2, only one grounding electrode 8 is provided, and commonly used for both the electrodes 6 and 7 as illustrated in FIGS. 4 and 5. However, exclusive grounding electrodes may be respectively opposed to the discharging electrodes 6 and 7. Further, the discharge starting potential can be freely regulated by altering the distance between the electrodes 6, 7 and the electrode 8 as well as the shape of the electrodes.

In the liquid crystal antidazzle mirror of the invention thus constructed as described above even if a static electricity is charged in the liquid crystal element 1 section, when the charged potential becomes a predetermined level or higher, the static electricity is discharged from the electrodes 6, 7 to the electrode 8 to prevent the liquid crystal element 1 section from electrostatically charging. Therefore, an abnormal voltage due to the static electricity is not applied to the liquid crystal drive circuit 3 to effectively protect the liquid crystal and the drive circuit against the static electricity.

According to the present invention as described above. since the liquid crystal antidazzle mirror is constructed and operated as described above, the liquid crystal element and the drive circuit may be protected against the static electricity to prevent the antidazzle mirror from erroneously operating, deteriorating in the characteristics, damaging in the insulation, thereby improving the reliability of the antidazzle mirror.

What is claimed is:

1. A liquid crystal antidazzle mirror comprising;
discharging electrodes respectively provided at liquid crystal electrodes of a liquid crystal element, and
a groundig electrode opposed to the discharging electrodes for discharging static electricity charged in the liquid crystal section element between the discharging electrodes and the grounding electrode.

2. The liquid crystal antidazzle mirror according to claim 1, wherein two grounding electrodes are respectively opposed to said discharging electrodes.

* * * * *

UNITED STATES PATENT AND TRADEMARK OFFICE
CERTIFICATE OF CORRECTION

PATENT NO.　　:　　4,820,022

DATED　　　　　:　　11 April 1989

INVENTOR(S) :　　Hiroshi DEMURA et al.

It is certified that error appears in the above-identified patent and that said Letters Patent is hereby corrected as shown below:

Add FIGS. 4 and 5, as attached.

The sheet of drawing consisting of figures 4 and 5 should be added as shown on the attached sheet.

Signed and Sealed this

Twelfth Day of November, 1991

Attest:

HARRY F. MANBECK, JR.

*Attesting Officer*　　　　*Commissioner of Patents and Trademarks*